March 26, 1963 L. P. LARSON ET AL 3,082,583
CONTAINER AND METHOD OF FORMING SAME
Filed July 18, 1960 7 Sheets-Sheet 1
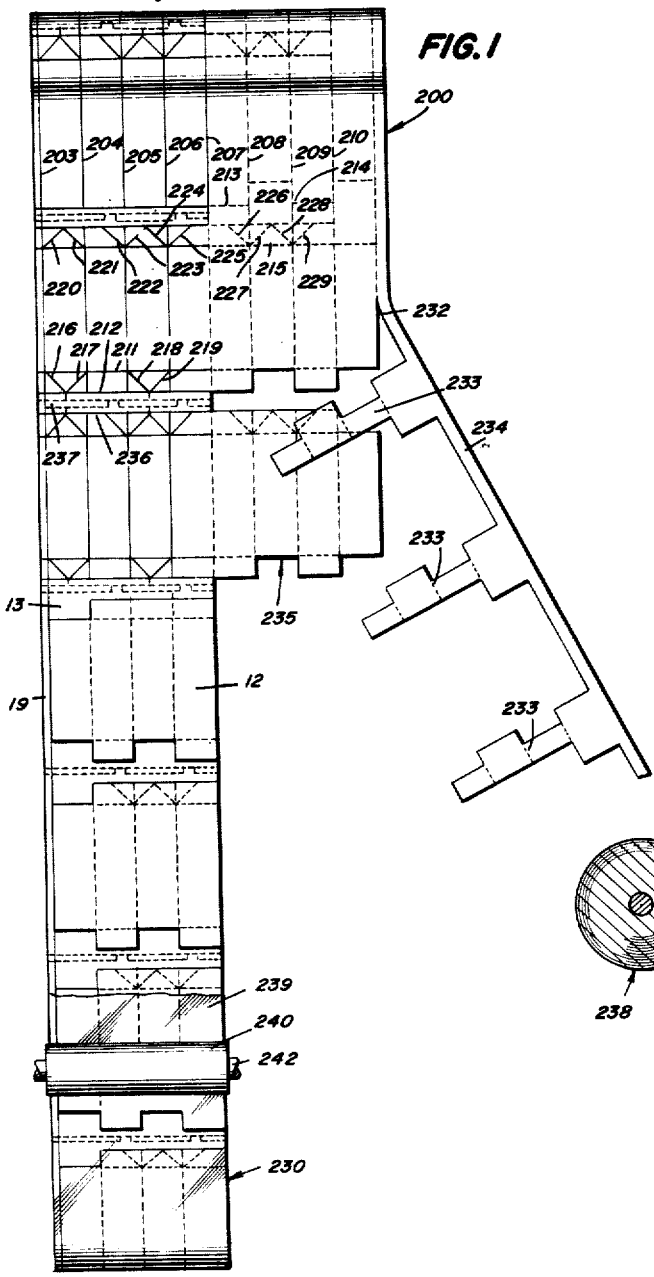
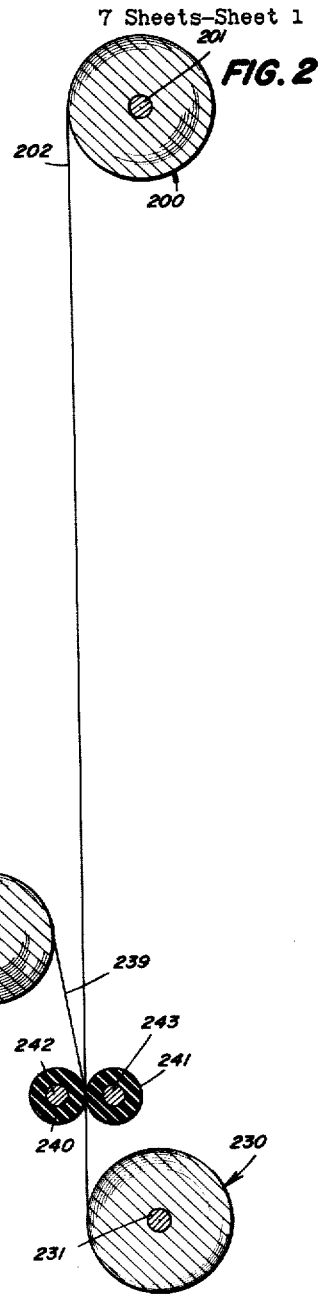
INVENTORS
LOUIS P. LARSON &
WALTER C. GEORGE
BY
ATTORNEY March 26, 1963 L. P. LARSON ET AL 3,082,583
CONTAINER AND METHOD OF FORMING SAME
Filed July 18, 1960 7 Sheets-Sheet 2
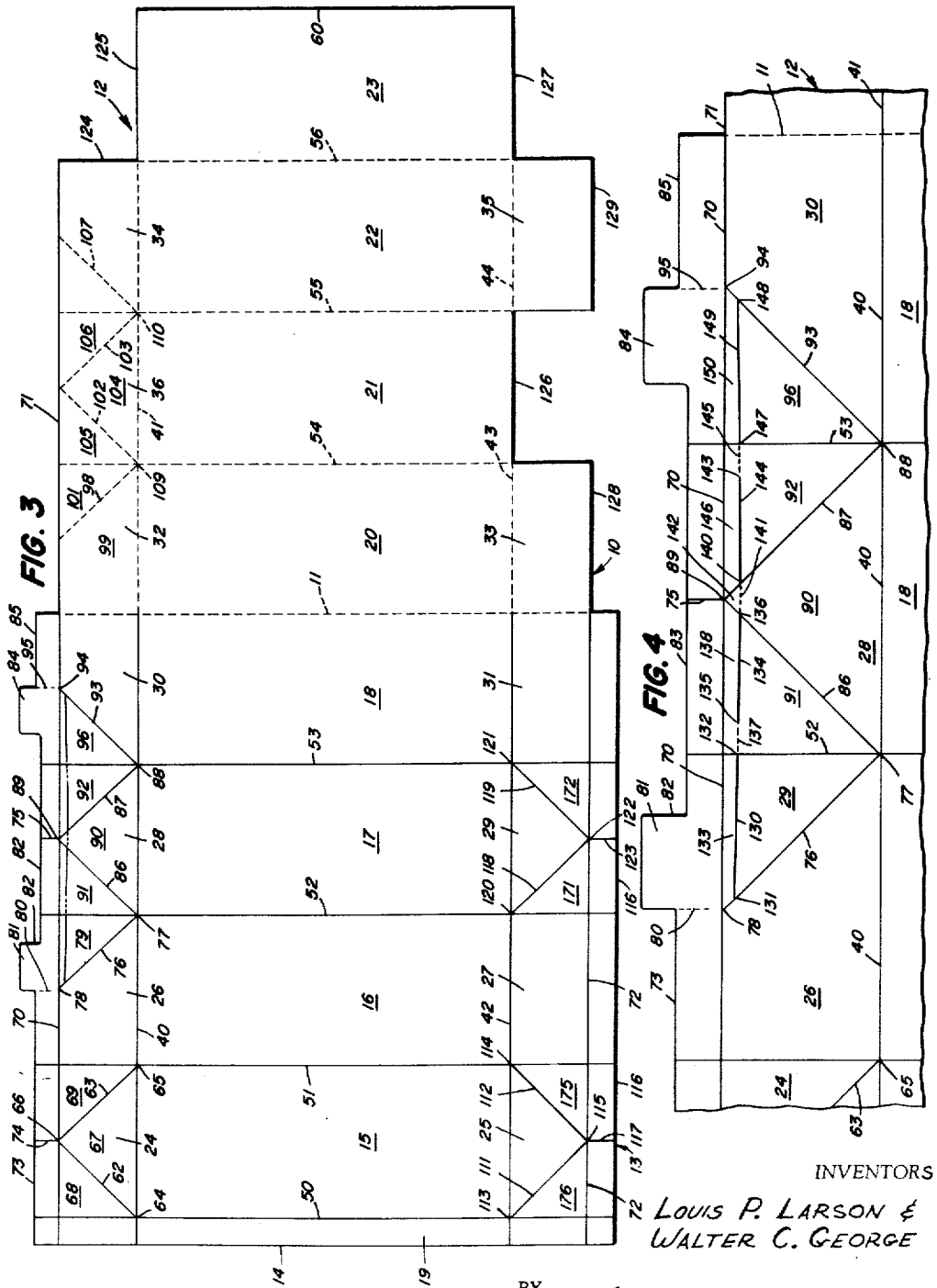
INVENTORS
Louis P. Larson &
Walter C. George
BY William H. Ugh
ATTORNEY

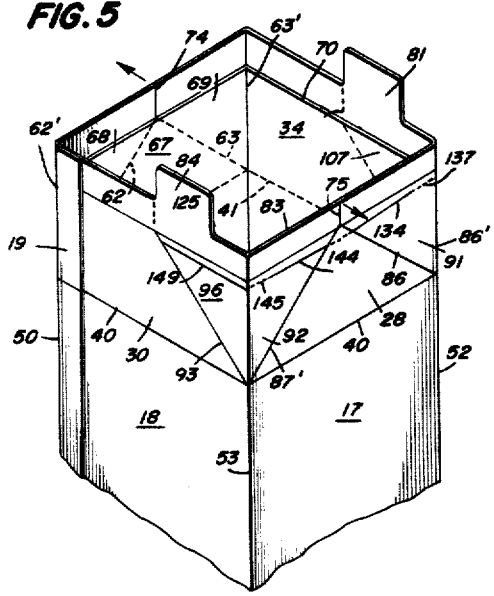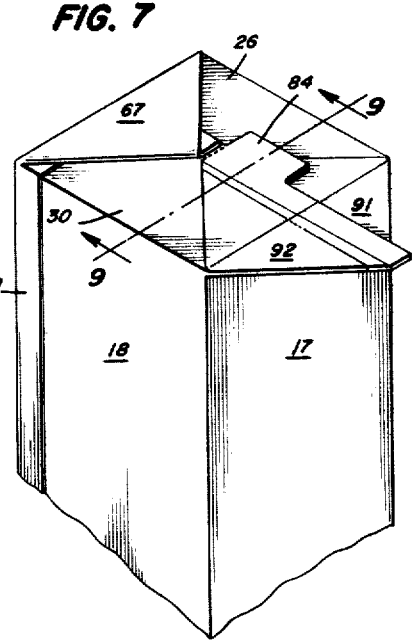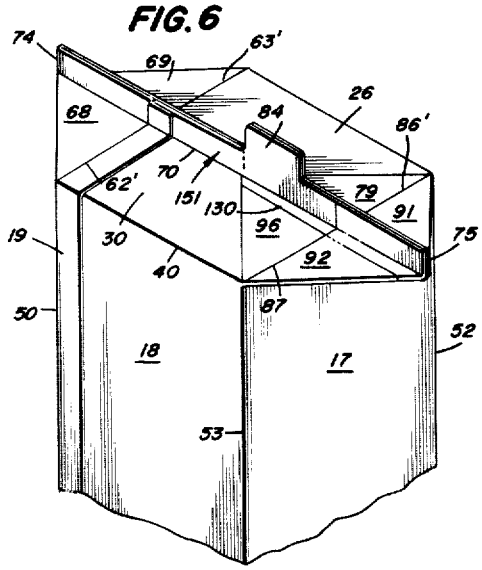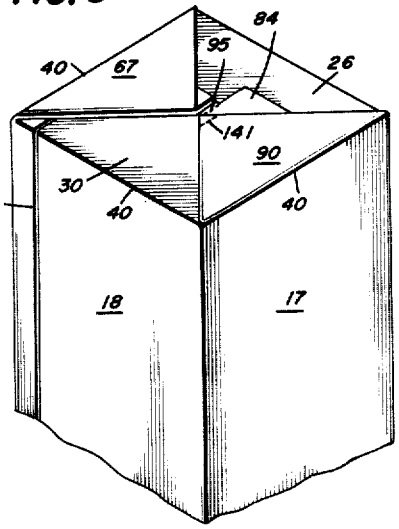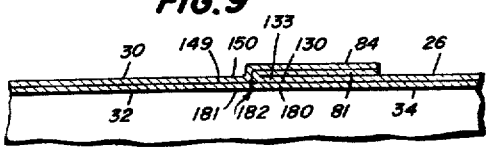

March 26, 1963     L. P. LARSON ET AL     3,082,583
CONTAINER AND METHOD OF FORMING SAME
Filed July 18, 1960     7 Sheets-Sheet 4
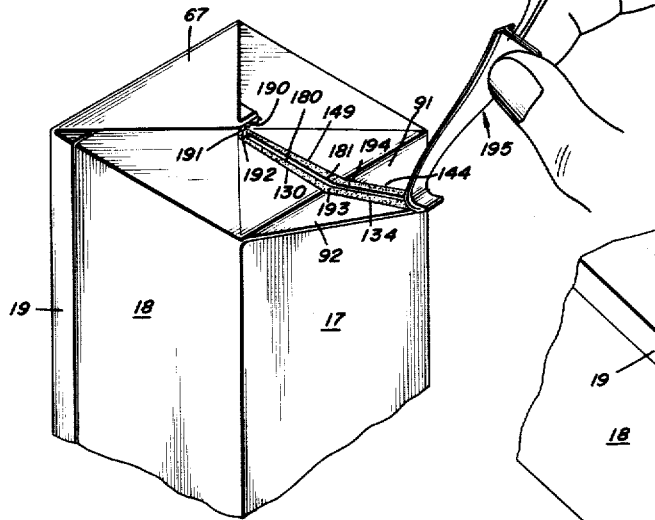
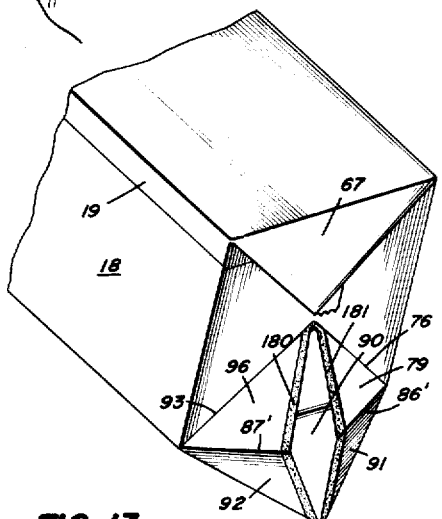
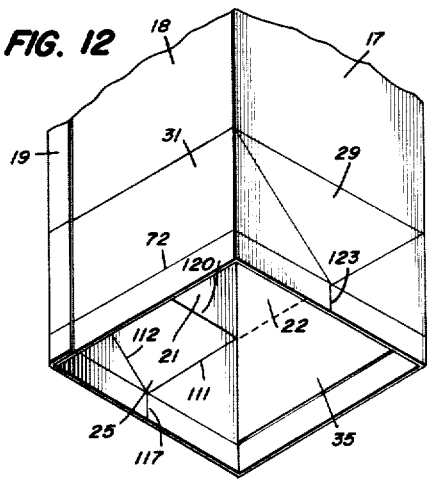
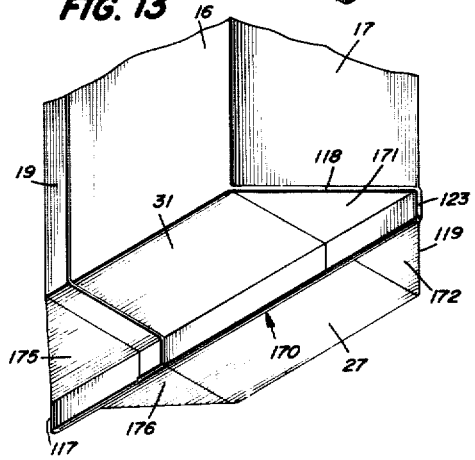
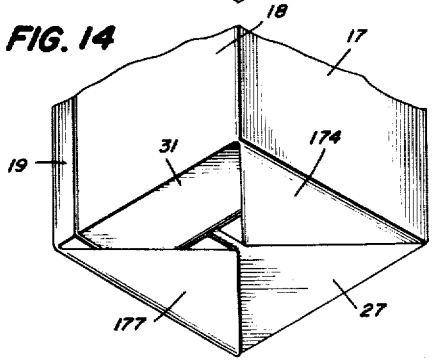
INVENTORS
LOUIS P. LARSON &
WALTER C. GEORGE
BY
ATTORNEY March 26, 1963   L. P. LARSON ET AL   3,082,583
CONTAINER AND METHOD OF FORMING SAME
Filed July 18, 1960   7 Sheets-Sheet 5
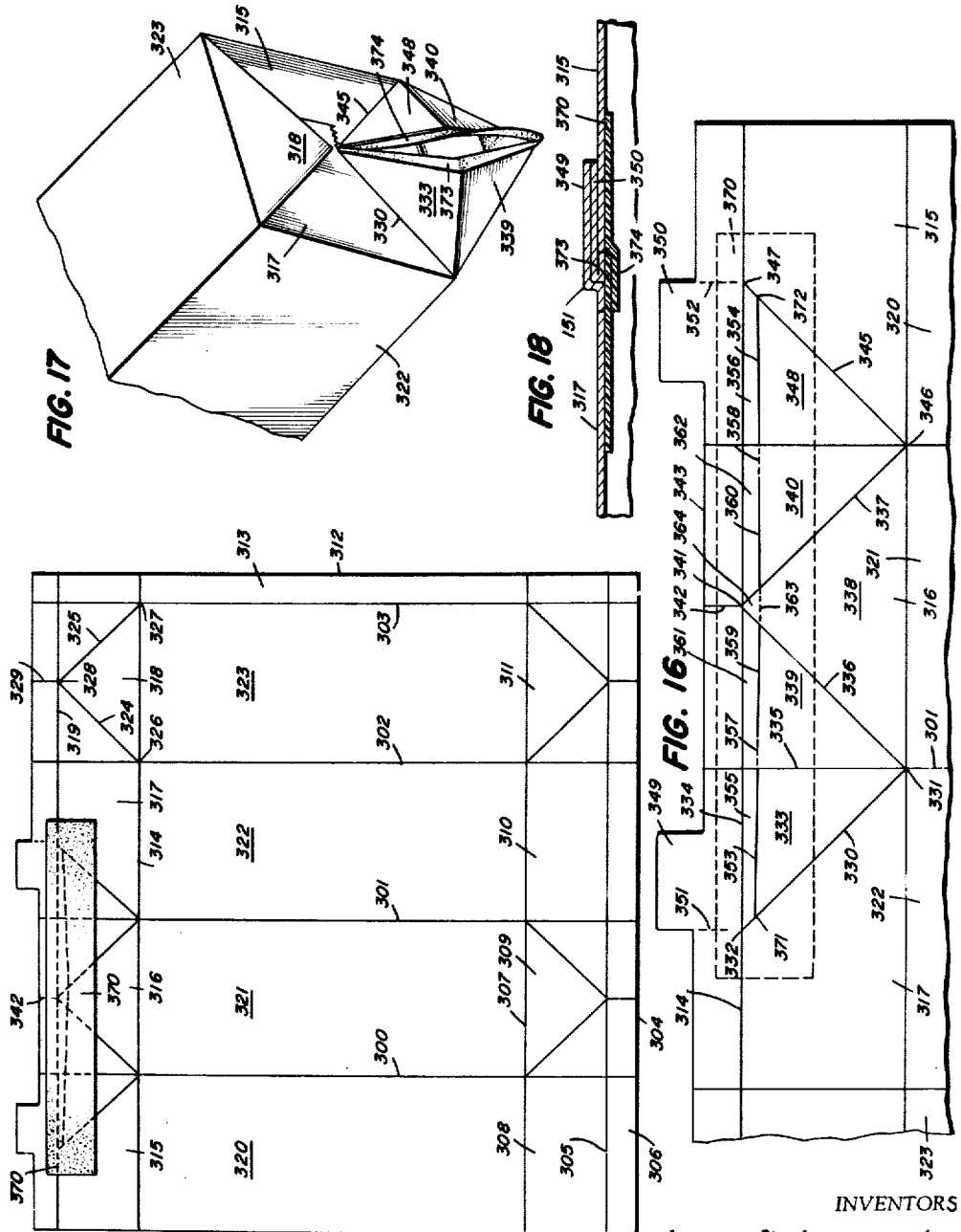
INVENTORS
LOUIS P. LARSON &
WALTER C. GEORGE
BY
ATTORNEY March 26, 1963 L. P. LARSON ET AL 3,082,583
CONTAINER AND METHOD OF FORMING SAME
Filed July 18, 1960 7 Sheets-Sheet 6
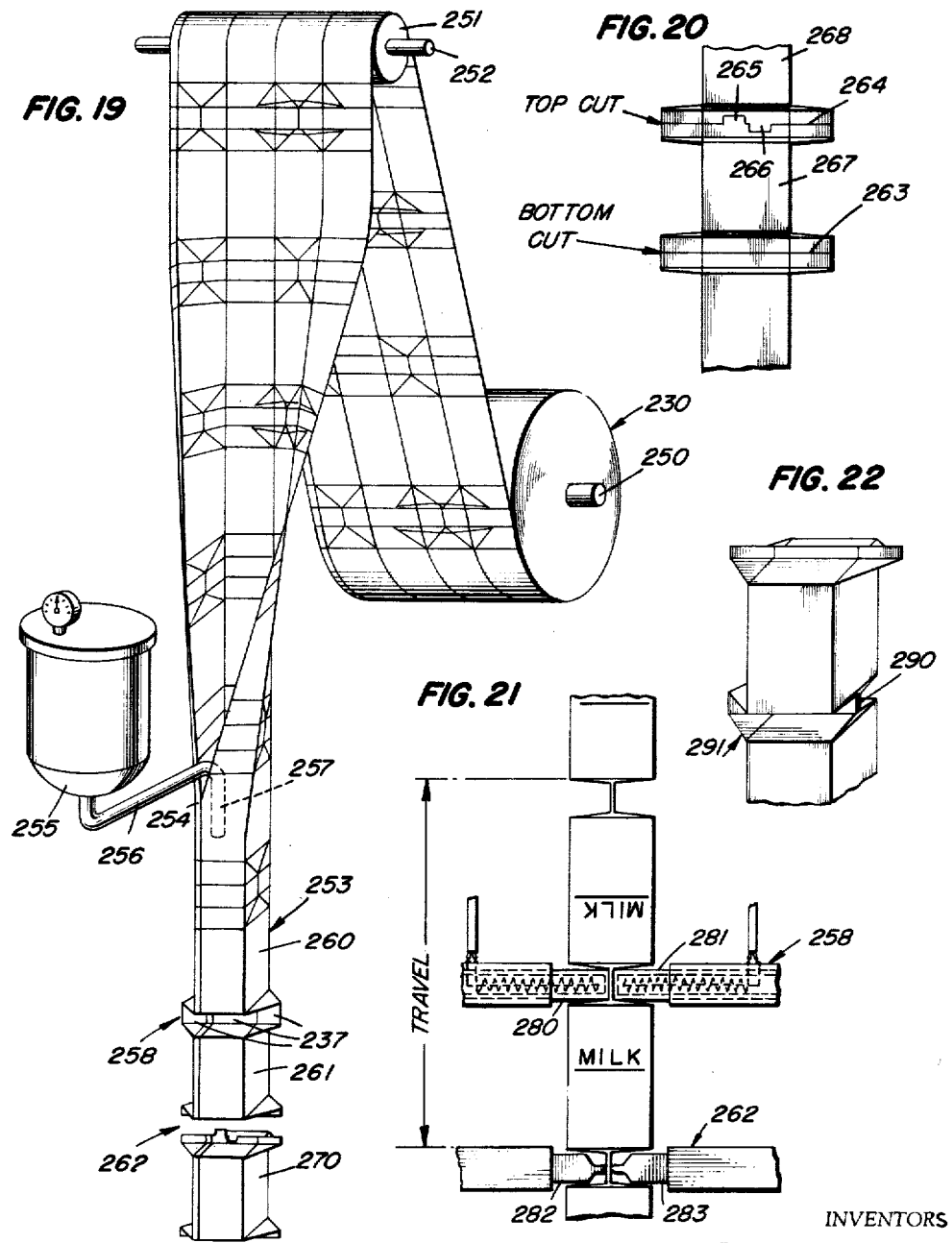
INVENTORS
LOUIS P. LARSON &
WALTER C. GEORGE
BY William J. Tye
ATTORNEY

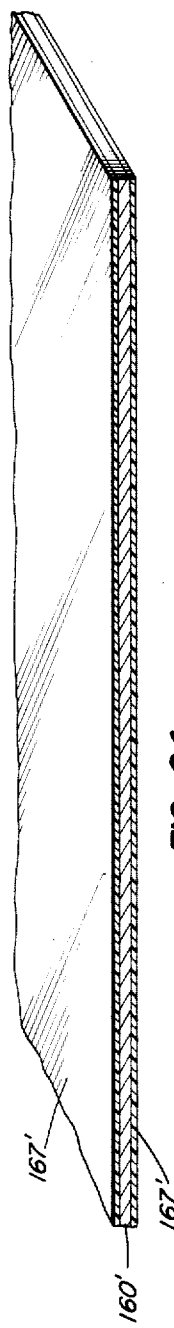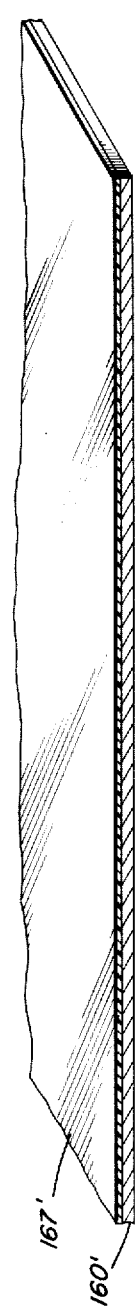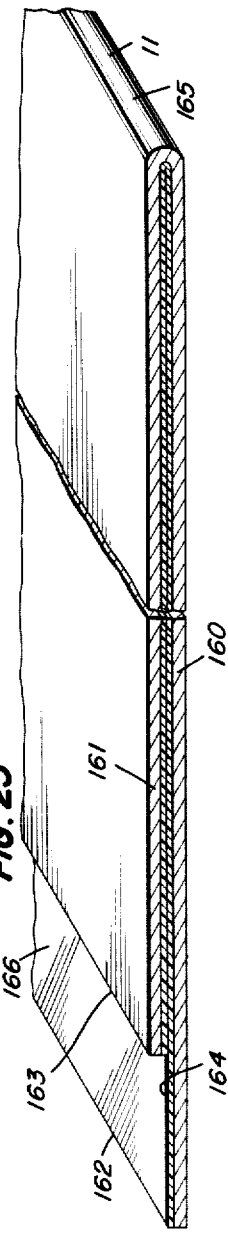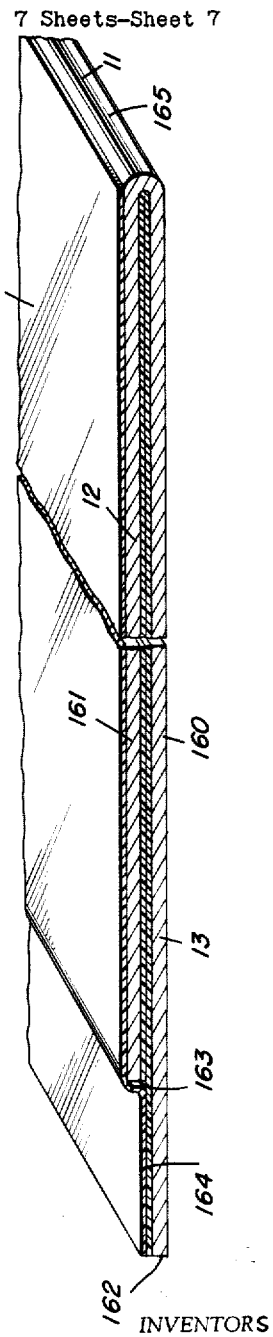

United States Patent Office 3,082,583
Patented Mar. 26, 1963

3,082,583
CONTAINER AND METHOD OF FORMING SAME
Louis P. Larson, Glendale, and Walter C. George, St. Louis, Mo., assignors, by mesne assignments, to Riegal Paper Corporation, New York, N.Y., a corporation of Delaware
Filed July 18, 1960, Ser. No. 43,525
9 Claims. (Cl. 53—29)

The present invention relates in general to paperboard containers of such type, for example, as are utilized for the packaging of dairy products, particularly milk and cream, and the invention also pertains to the method of fabricating, erecting and filling such containers.

The paperboard container in accordance with the present invention is characterized by its novel construction enabling the container to be easily opened and wherein the container is of the type which, when opened, forms its own pouring spout which is formed by portions of the container proper normally disposed in folded relationship to the container when the same is sealed.

At the present time, paperboard containers for many products have replaced heretofore more commonly used containers. For example, milk and cream are largely packaged in paperboard containers in contrast to the bottles previously used almost universally. Such paperboard containers are advantageous as compared with previous containers by virtue of the fact that they are disposable and, therefore, represent no problem as concerns returning the containers, sterilizing them and so forth. With the advent of paperboard containers of this type, the art has steadily advanced until at the present time it is common to have paperboard containers which are very easily and quickly opened and which form their own pouring spout, which spout can be re-folded to close the container for storage after having been opened and the contents partially used. In connection with the present invention, it is of primary concern to provide a paperboard container such as is generally outlined above in which the means for opening the container forms a novel departure from previous containers of this type and, ancillary thereto, the present invention is also directed to a novel container blank and method of container fabrication.

In order to provide the greatest economy in connection with the packaging and sale of products in which the aforementioned paperboard containers are used, it becomes essential and extremely important to minimize as much as is possible the cost of fabricating the paperboard containers as well as the cost of erecting these containers and filling them with the desired product. The present invention is directed to this end also. More particularly, the present invention pertains to a paperboard container which is characterized by the elimination of the necessity for providing expensive water proofing. For example, the present invention contemplates the use of an ordinary kraft paper for the body of the container in which the inner surface of the container is coated with a synthetic resin film which at once forms the means for rendering the container fluid tight and which also forms the means by which the container is sealed and secured when erected.

The present container and the construction thereof allows for stacking the containers one upon the other. The unique type of pouring spout and construction of the dispensing end of the container as well as the bottom of the container permits stacking.

A further feature of the present invention resides in the method of fabricating blanks for paperboard containers of the character described in which the method facilitates the subsequent steps of erecting and filling the individual containers. More specifically, this objective is achieved by forming the blanks for the individual containers in a series of flat strip forms or which may be ultimately disposed in a roll which may subsequently be unrolled, erected, filled and closed in continuous fashion, that is to say, with the individual containers still connected together in end-to-end relationship with the individual containers being ultimately severed one from the other during the terminal steps of the erecting, filling and closing operations. In this fashion, the erecting, filling and closing steps are greatly expedited which, of course, represents a material saving in cost.

A further object of this invention resides in the provision of a paperboard container blank characterized by the fact that it is provided with an edge portion which has associated therewith a line of weakening so that such edge portion may be bodily removed from the remainder of the blank before the blank has been erected into container form and sealingly closed to hold the commodity packaged therein.

A still further object of this invention resides in the provision of a novel container having a top flap assembly which is characterized by having a transversely extending spine formed by joined opposite edge portions of the container blank, which spine is subsequently, during the closing operation of the container, laid down flat upon the upper end of the container with laterally projecting flaps folded thereover, such spine constituting the closure for the corresponding end of the container, and such spine being characterized in that the opposite edge portions of the container which are joined together to form such spine have a portion thereof formed with lines of weakness so that a portion at least of the spine may be bodily removed from the remainder of the container and whereupon the container is opened by such removal to liberate one of the infolded flaps which then forms a pouring spout through which the contents of the container may be poured.

A further object of this invention is to provide a novel type of container which incorporates novel opening means in the form of edge portions of the container which are formed with lines of weakening so that such edge portion may be bodily removed from the remainder of the container and thus provide an opening therefor to gain access to the contents of the container, and which line of weakness, for the purpose of effectively sealing the container, is backed by sealing means which may take the form either of a separate individual strip of sealing material or may be incorporated in a double thickness container portion in which the interiorly disposed layer of thickness forms the sealing means for the overlying weakened line portions.

Another object of this invention resides in a novel means for opening a paperboard container in which the openable end of the container has opposite edge portions thereof joined together to seal the container across such end and with such joined edge portions forming a spine of double thickness and with there being weakened lines running from the free longitudinal edge of such spine inwardly thereof in both thicknesses to and beyond the inner line of joining of such thicknesses and then along parallel generally to such inner line so that at least a portion of such spine may be torn bodily away to provide an opening slit across at least a portion of the stated end of the container, such weakened line portions having underlying the same, sealing strips which, are releasably joined along the inner line of the spine, above the said lines of weakness.

A further object of this invention lies in the method of forming a roll constituting a series of end to end joined container blanks, each such blank being of double layer thickness and formed from an initially flat wide sheet having one side edge portion thereof cut away and severed in a prescribed and predetermined manner and then folded over upon the remaining edge portion to form a double thickness and with there also being in such remaining portion certain lines of severance and weakening therein, with the said one side edge portion underlying such lines of weakening, to ultimately form a sealing backing for such lines of severance and weakening whereby when the individual blanks are erected and closed, they form a liquid tight container whereas the lines of weakening and severance provide means whereby the containers are easily and quickly opened.

Another object of this invention is to provide an improved container assembly characterized by the fact that the blank is backed with a synthetic resin film or sheet such as polyethylene film which serves as a means for heat sealing the container and also as a means for rendering the same liquid tight.

Another object of this invention is to provide a novel method of fabricating, erecting and filling containers in which a series of container blanks are formed in interconnected fashion so as to form a strip comprising a plurality of such blanks and wherein the method includes the steps of erecting such containers progressively and sequentially, then filling the same and closing the individual containers and then effecting the severance of such a closed, filled individual container from the strip of blanks.

Another object of this invention is to provide improvements in the method of erecting and filling containers wherein such is accomplished in continuous fashion whereby the containers being erected and filled are maintained in interconnected, link-like fashion until the completion of the filling of an individual container and then closing or sealing of the same, whereafter such a filled, sealed container is then separated from the rest.

Another object of this invention is to provide an improved container blank which is characterized by a plurality of rectangular panels in the central area thereof and extending between opposite side edges of the container blank with the opposite ends of the blank being formed so as to provide closable ends characterized by their ability to be disposed in coplanar relationship and having end marginal edge portions which may be sealed together to form the closure for the container, with triangular flaps of the container end portions projecting laterally outwardly to be ultimately folded back upon the top of the container in covering relationship to the sealed marginal edge portions, and wherein part of the sealed marginal end oprtions are removable so as to permit opening of the container readily and quickly.

A further object of this invention resides in the provision of an improved container construction which is characterized by an upper end construction which, in the process of being closed and sealed, presents flap portions extending from opposite sides of the container and with there being a sealed edge extending across the container top and across the flaps and with portions of the top and flaps on either side of the sealed portion for a substantial extent thereof being provided with lines of weakening or severance sealed on the underside of the top and flaps by means extending to, but not across, the sealed edge portions of the top so that the weakened portion of the container may be removed in strip-like fashion to open the top of the container across substantially half the extent thereof and along the flap to provide a pouring spout.

Still another object of this invention resides in the provision of a novel container construction in which the same is preformed so as to provide a novel opening means therefor in which the same lends itself readily to economical construction so as to minimize the cost of the container and yet in which the container is entirely adequate for the purposes intended.

The invention will be best understood from a consideration of the following detailed description taken in connection with the accompanying drawings with the understanding that the invention is not confined to a strict conformity with the showing of the drawings but may be changed or modified so long as such changes or modifications mark no material departure from the salient features and spirit of the invention as expressly described hereinafter.

In the drawings:

FIG. 1 is a view showing the manner in which one form of container blank is formed;

FIG. 2 is a longitudinal section taken through the assembly shown in FIG. 1 and illustrating the manner in which the sealing layer is applied to the roll blank;

FIG. 3 is a plan view of a single blank constructed in accordance with this invention;

FIG. 4 is an enlarged view showing a portion of the blank illustrated in FIG. 3 and serving to illustrate certain of the features thereof;

FIGS. 5-8 are perspective views of the upper portion of the container illustrating sequential steps in the closing thereof and the formation of the openable top;

FIG. 9 is a transverse sectional view on an enlarged scale, taken generally along the plane of section line 9—9 in FIG. 7, illustrating certain features of the novel method of opening the container;

FIG. 10 is a perspective view showing the manner in which the container is opened;

FIG. 11 is a perspective view showing the container in opened position and formed into a pouring spout;

FIGS. 12-14 are perspective views illustrating the bottom construction of the container in various stages of closure;

FIG. 15 is a plan view of a modified form of blank assembly of single thickness construction and illustrating the sealing strip utilized in conjunction therewith;

FIG. 16 is an enlarged view showing a portion of the blank illustrated in FIG. 15 from the outer side thereof and illustrating the line of weakening in the blank which permits of the novel opening thereof;

FIG. 17 is a view similar to FIG. 11 but showing the modified container construction;

FIG. 18 is a view similar to FIG. 9 but taken through the modified container construction;

FIG. 19 is a perspective view showing a container blank roll and subsequent stages of erecting, filling and closing containers in a continuous fashion;

FIG. 20 is an elevational view showing certain steps in the filling and closing method;

FIG. 21 is a view diagrammatically illustrating certain steps in the filling and closing operations;

FIG. 22 is a partial perspective view showing an alternate form of closing the containers;

FIG. 23 is a sectional perspective view illustrating one form of paperboard construction utilized in conjunction with the containers of the present invention;

FIG. 24 is a view similar to FIG. 23 but illustrating a modified construction;

FIG. 25 is a sectional perspective view taken transversely through a double thickness blank illustrating one form of construction thereof during the formation of a blank roll; and FIG. 26 is a view similar to FIG. 25 but illustrating the finished construction of the assembly.

As will be more readily apparent hereinafter, although there are several ways in which the present invention may be accomplished, the accompanying drawings are directed primarily to two species of container blanks. One such form of blank is illustrated best in FIGS. 3 and 4 and reference is had to these figures more particularly at this time.

Essentially, the blank shown in FIG. 3 is a double layer blank, that is to say, the container blank is formed with a double thickness of paperboard and in the particular instance shown, such double thickness is achieved by folding over a single sheet upon itself so that the double layer is achieved. The blank as shown in FIG. 3 has not as yet been doubled over upon itself but is shown for the purpose of clarity in the unfolded position. Ordinarily, it is contemplated that the folded over sheet be provided with some adhesive means or the equivalent thereof to secure the contiguous portions together and there is also provided, as hereinafter more clearly set forth, means on the inner side of such blank for rendering the material fluid tight.

The blank as shown in FIG. 3 consists of a single sheet of paperboard which, for example, may be constructed of ordinary kraft board and which sheet is indicated generally by the reference character 10. Extending longitudinally of the sheet and closely adjacent the center line thereof is a line of perforations 11 or any suitable score line and about which line the right hand side of the blank indicated generally by the reference character 12 is folded over onto the left hand side of the blank which is indicated by the reference character 13. It is to be understood that the right hand side or section 12 of the blank as shown in FIG. 3 and as defined by the weakened line 11 will be folded over along line 11 onto the section 13 in such a manner that section 13 underlies the right hand side 12 as shown in FIGS. 1 and 26. That is to say, the inner surface of the right hand section 12 is shown in folded over position in the lower part of FIG. 1.

Thus, the physical extent of the blank, when in completed form, will be such that the left hand boundary thereof will be along the edge 14 and the right hand boundary will be along the edge defined by the line of perforations 11. This leaves a blank having a series of rectangular panels 15, 16, 17 and 18 and, along one side edge, a glue strip 19, the purpose of which will be presently apparent. The right hand side 12 is divided up into a series of generally rectangular panels 20, 21, 22 and 23 which are of area similar to the panels 15—18 and it being understood that when the blank is in the folded condition, so as to provide the double wall thickness blank, the panel 23 will overlie the panel 15, the panel 22 will overlie the panel 16, the panel 21 will overlie the panel 17 and, of course, the panel 20 will overlie the panel 18. Preferably, means, hereinafter more fully described, are provided for adhesively securing the two blank portions together into contiguous face-to-face contact.

The panels 15—18 and 20—23 might better be designated as main body panels. For the most part, these main body panels are provided with upper and lower end panels integral therewith. For example, the main body panel 15 is provided with an upper end closure panel 24 and a lower end closure panel 25, the main body panel 16 is provided with the upper partial closure and spout forming end panel 26 and a lower end closure panel 27, the main body panel 17 is provided with an upper closure and spout end panel 28 and a lower closure end panel 29, whereas the main body panel 18 is provided with an upper partial closure and spout forming end panel 30 and a lower closure end panel 31. Likewise, the main body panel 20 which overlies the panel 18 is provided with an upper partial closure and spout forming end panel 32 and a lower closure end panel 33, the main body panel 22 being provided with a lower closure end panel 35, and an upper partial closure and spout forming panel 34, which is similar to 26, while the panel 21 which lies between the main body panels 20 and 22 is provided only with an upper end closure and spout forming panel 36, similar to 28, and the end main body panel 23 which overlies the main body panel 15, has neither an upper nor a lower end closure panel, substantially as is shown. The purpose for the omission of certain of the end panels will be more apparent hereinafter.

The upper closure and/or spout forming end panels 24, 26, 28, 30, 32, 34 and 36 are defined beyond a fold or score line 40 in the outer side portion of the blank and beyond the line of perforation 41 in the inner side of the blank. Likewise, the lower end panels in the outer side portion of the blank are defined below the score line 42 or below the lines of perforation 43 and 44 in the inner side portion of the blank.

To divide the blank into the series of main body panels and end panels, there are provided score lines or lines of perforation, as the case may be. For example, the main body panel 15 is bounded on opposite sides thereof by a longitudinally extending score line 50 on one side, a longitudinally extending score line 51 on the opposite side and by the upper and lower score lines 40 and 42 at its ends. The panel 16 is bounded on its opposite sides by the score line 51 and by a further longitudinally extending score line 52. In similar fashion, a further score line 53 is provided in the left hand side 13 of the blank and lines of perforation 54, 55 and 56 are provided in the right hand side 12 of the blank. It will be understood that, although the overlying portion 12 of the blank is shown as being provided with lines of perforation rather than merely score lines, the same may as well be provided with score lines rather than lines of perforation which extend completely therethrough. However, since the blank is ultimately to be folded into a generally rectangular configuration, by providing lines of perforation in the overlying portion 12 of the blank, the folding operations are made easier since these lines of perforation extend substantially through the material of the blank and hence make it easier to fold along these lines. Or for that matter, it is perfectly possible that any combination of score lines and perforations, either all perforations or all score lines or any combination thereof, may be utilized since it is normally contemplated by the exposed inner side of the blank at least to be provided with some means for rendering it fluid tight and indeed the outer side may also be provided with such sealing means. Therefore, in most instances it will be immaterial whether perforations are used throughout or only in part or whether score lines are used throughout or only in part.

It will be understood that the edge 60 of the main body panel 23 will lie along the score line 50 when the blank is in the flat folded condition, leaving the glue strip 19 free. This constitutes what is commonly termed a manufacturer's joint inasmuch as when the container is erected, as described more fully hereinafter, the glue strip 19 will overlie and lap over a portion of the main body panel 18 along the edge thereof defined by the score lines 11 and any suitable adhesive or other securing means being provided to obtain securement at this point and to form thereby the so-called manufacturer's joint.

Certain of the upper and lower end closure and/or spout forming panels are provided with score lines or perforations whose function will be presently apparent. The panel 24 is provided with a pair of such score lines designated by the reference characters 62 and 63 which originate at the corners 64 and 65 of this panel 24 and converge upwardly therefrom to meet at a point along the longitudinal center line thereof as at 66 to divide the panel into a triangular panel portion 67 and two right triangular portions 68 and 69. The base of the triangular portion 67 lies along the score line 40 and is bounded on opposite sides thereof by the score lines 62 and 63, whereas the hypotenuse of the right triangular portion 68 is defined by the score line 62 and the opposite legs thereof by portions of the score line 50 and a further score line 70 which extends along the top marginal edge portion of the outerside 13 of the blank. Such score line 70 lies along an extension of the upper edge 71 of the overlying blank section 12, as is clearly shown. Likewise, the lower end of the outer side portion 13 of the blank is provided with a transverse score line 72.

The right triangular portion 69 has its hypotenuse formed by the score line 63 and its opposite legs by portions of the score line 51 and the score line 70. Extending from the point 66 outwardly to the free edge 73 of the blank is a short score line 74 and a similar score line 75 is provided in the region of the end panel 28, the purpose of these score lines being presently apparent.

The panel 26 is provided with a score line 76 extending from the upper corner 77 of the main body panel 16 to a point 78 on the scoreline 70 at the longitudinal center line of the body panel 16 to provide in this panel 26 a right triangular panel portion 79 whose hypotenuse is defined along the score line 76 and the opposite legs of which are defined along portions of the score line 70 and the score line 52, substantially as is shown. Extending inwardly from the edge 73 of the blank toward but terminating short of the point 78 is a shortline of perforation or weakening 80. This panel 26 is also provided with an upwardly projecting tab 81 which extends from the line of perforation 80 over towards the edge of the panel but terminating short thereof as along the line 82 and the upper edge 83 of the blank formed between this tab 81 and a similar tab 84 provided in the panel 30 is stepped downwardly with respect to the upper edge portion 73. Beyond the tab 84, the upper edge 85 once again lies at a height coincidental with the upper edge 73.

The panel 28 is provided with a pair of upwardly convergent score lines 86 and 87 originating at the points 77 and 88 at the respective upper corners of the main body panel 17 and meet at the point 89 on the score line 70 and at the base of the score line 75. Thus, panel 28 is divided into the triangular section 90 having its base lying along the score line 40 and the two right triangular panel portions 91 and 92.

Thus, the triangular portion 90 has its base along the score line 40 and its opposite legs along the score lines 86 and 87, the right triangular panel portion 91 has its hypotenuse lying along the score line 86 and its opposite legs along a portion of the score line 52 and a portion of the scoreline 70 with the hypotenuse of the right triangular panel portion 92 lying along the score line 87 and its opposite legs along portions of the score line 70 and the score line 53.

Panel 30 is provided with a score line 93 originating at the point 88 at one upper corner of the body panel 18 and extending therefrom to the point 94 formed at the intersection of the longitudinal center line of the panel 18 and the score line 70. Starting at a point 94 and extending therefrom to the edge 85 is a line of perforation 95 corresponding to the line of perforation 80.

The score line 93 forms the hypotenuse of a right triangular panel portion 96, the opposite legs of which lie along portions of the score lines 53 and 70.

The upper panel 32 is provided with a score line or perforation 98 dividing this end panel into the trapezoidal portion 99 and the right triangular portion 101. Similarly, the panel 36 is provided with score lines or perforations 102 and 103 dividing such panel into the triangular portion 104 and the right triangular portions 105 and 106. The panel 34 is provided with the score line 107, substantially as shown. The score line 98 originates at the point 109 at one upper edge of the body panel 20 and extends to the upper edge 71 to a point coincidental with the longitudinal center line of the panel 20. The score line 102 originates at the point 109 and meets the score line 103 at the edge 71 coincidental with the longitudinal center line of panel 21 with the origin of the score line 103 being the upper corner 110 of the body panel 21. This point 110 also is the origin for the score line 107 which extends to the edge 71 at a point coincidental with the longitudinal center line of the panel 22.

The lower end closure panel 25 is provided with a pair of downwardly convergent score lines 111 and 112 originating respectively from the lower corners 113 and 114 of the main body panel 115 and meeting together at the score line 72 at the point 115 coincidental with the longitudinal center line of the main body panel 15. From this point 115 to the lower edge 116 of the outer side portion 13 of the blank is a short score line 117 similar to the score line 74.

The end panel 29 is provided with a pair of score lines 118 and 119 originating at the lower corners 120 and 121 of the main body panel 17 and converging downwardly therefrom to meet at a point 122 on the score line 72 coincidental with the longitudinal center line of the main body panel 17 and from this point 122 to the lower edge 116 is another short score line 123 corresponding to the score line 75.

When the overlying section 12 is folded over onto and in face-to-face contact with the outer section 13, it will be appreciated that the score line 98 of the end panel 32 will overlie and extend along the score line 93 in the end panel 30, the score lines 102 and 103 in the end panel 36 will respectively overlie the score lines 87 and 86 of the end panel 28 and the score line 107 in the end panel 34 will overlie the score line 76 in the end panel 26. Because the body panel 23 is not provided with an end panel, being cut away along the lines 124 and 125, the end panel 24 will have no overlying portion.

At the bottom, the end panel 33 overlies the end panel 31 and the end panel 35 overlies the end panel 27. The cut-away portions 126 and 127 in the overlying section 12 extend over the end panels 29 and 25 respectively. It will be noted also that at the top, the marginal edge portion lying beyond the score line 70 is beyond the upper edge 71 of the overlying section 12 and, likewise, the marginal edge portion at the lower end of the blank which lies beyond the score line 72 is beyond the edges 128 and 129 of the end panels 33 and 35, which edges 128 and 129 constitute the lowermost extremity of the overlying section 12. Thus, the upper and lower marginal edge portions formed beyond the score lines 70 and 72 respectively are free and unobstructed on their inner sides.

Referring more particularly to FIG. 4, it will be seen that extending between the tabs 81 and 84 the blank is formed with a line of severance or weakening which includes a slit 130 in the right triangular panel portion 79 extending from the point 131 on the score line 76 to a point 132 on the longitudinal score line 52, this slit being generally parallel to the score line 70 and spaced closely thereto so as to leave a narrow strip 133 therebetween. The right triangular panel portion 91 is likewise provided with a slit 134 which extends from a point 135 spaced somewhat from the point 132 and which extends therefrom a point 136 on the score line 86. Between the two points 132 and 135, there is preferably provided a coaxial line of perforations or weakened lines 137, the line of perforations 137 and the slit 134 cooperating to form an extension of the slit 130 and to provide a strip 138 between the score line 70 and the line of perforation 137 and the slit 134. Across the apical portion of the triangular panel portion 90 from the point 136 to point 140 which is directly opposite thereto but which lies on the score line 87 is a line of perforation 141 leaving the small triangular tip portion 142 which is bounded on two sides by the score lines 86 and 87 or the uppermost portions thereof and along its base by the line of perforation 141. The line of weakening continues from the point 140 to the point 143 spaced from the score line 53 by the provision of a slit 144 and from this point 143 to the score line 53 is a line of perforation or weakness 145, the slit 144 and line of perforation 145 providing the narrow strip 146 between them and the score line 70. From the point of intersection 147 between the line of weakening and the score line 53 to an opposite point 148 on the score line 93 is a further slit 149 generally parallel to the score line 70 and presenting the narrow strip 150 in the region of the right triangular portion 96.

As hereinafter set forth, this line of perforation or weakening forms a means by which the erected and closed container may be very easily opened. It will be noted that the two lines of perforation 80 and 95 extend inwardly from the respective free edge portions 73 and 85 but terminate just short of the score line 70 and then the lines of weakening re-commence at the points 131 and 148 so that there is a gap between the lines of perforation 80 and 95 and the opposite ends of the horizontally extending portions of the lines of weakening.

Referring at this time more particularly to FIG. 5, the assembly as shown therein represents an upper portion of a container which has been erected but not closed. The first step in closing the container is shown in FIG. 6, this being effected by folding the upper marginal edge of the erected blank as shown in FIG. 5 into an upstanding single plane with the fold lines lying along the score line portions 74 and 75 so that such upper marginal edge portion including the tips 81 and 84 form an upwardly projecting spine indicated generally by the reference character 151. The two end panel portions 26 and 30 and their corresponding underlying portions 34 and 32 respectively are folded inwardly toward each other to lie in a common horizontal plane. Also lying in a common horizontal plane with such portions 26 and 30 are the right triangular panel portions 68, 69, 91 and 92. Underlying the right triangular portions 68 and 69 is the triangular portion 67 and underlying the right triangular portions 91 and 92 is the triangular portion 90, these several triangular portions at this point constituting flaps which project laterally outwardly from the opposite sides of the container. Next, the spine 151 is folded flat as in FIG. 7 and then the laterally projecting flap portions are folded flat onto the top of the container, as is better illustrated in FIGS. 7 and 8. The portions 62' and 63' of the score lines 50 and 51 respectively, see FIG. 6, overlie a portion of the score line 40 and the laterally extending flap formed by the right triangular portions 68 and 69 and the underlying portion 67 is folded over about these score lines, that is about the score line 40 and the score lines 62 and 63, of course, after the spine 151 has been folded flat upon the top of the container. The portions 87' and 86' of score lines 53 and 52 overlie another portion of the score line 40 when the flap comprised of the right triangular portions 91 and 92 and the underlying triangular portion 90 projects laterally outwardly as shown in FIG. 7 and this flap is folded about these several score lines into the ultimate position shown in FIG. 8. Thus, when the container is fully closed as shown in FIG. 8, the triangular portion 67 is exposed on one side of the container and the triangular portion 90 is exposed on the opposite side of the container, with the apexes of these two triangular portions lying closely adjacent each other in the central region of the top of the container. In this position also, it will be noted that the line of weakening or severance for opening the container has only relatively short portions thereof exposed, namely the line of perforation 95 and the short line of perforation 141, the remainder of the line of severance or weakening underlying the inwardly folded flap portion comprised of the right triangular portions 91 and 92 which underlie the triangular portion 90.

In FIG. 23, there is disclosed the paper 160', paperboard or other material from which the containers are fabricated and the same is fluid proof on both sides as will be noted. The fluid proofing 167' may be a polyethylene film or a coating of polyethylene or any other suitable fluid proofing substance and in this instance the fluid proofing may, if desired, be different on the opposite sides of the paper or other material. In FIG. 24, it will be noted that the paperboard 160' is coated or has a fluid proofing film applied on only one side thereof.

In lieu of utilizing the paperboard as hereinbefore and hereinafter described, and such as shown in FIGS. 23–26, it is to be kept in mind that any suitable material which will serve the purpose may be used and, in this connection, it is conceivable that the material utilized would not have to be fluid proofed but have water proof or fluid proof characteristics. The material utilized may be coated or impregnated with paraffin or the like.

Referring at this time more particularly to FIGS. 25 and 26, one manner of forming the double thickness container blank is shown. In the specific embodiment illustrated, the outer blank portion is designated by the reference character 160 and the inner blank portion is designated by the reference character 161, see particularly FIG. 25. Initially, when this blank is formed, the inner side of each of the blank portions 160 and 161 is provided with a film of polyethylene which is continuous between the opposite side edges 162 and 163 of the blank before it is folded over, such film being designated by the reference character 164. After the polyethylene film is secured in place and adhesively secured or bonded to the portions 160 and 161, these two portions are folded together as shown along the fold line 165 which corresponds to the fold along the line 11 in FIG. 3 and the portion of the outer surface layer 160 which lies beyond the edge 163 of the inner surface portion 161 leaves a marginal edge 166 which corresponds to the marginal edge 19 in FIG. 3 and by means of which the aforementioned manufacturer's joint is effected. After the layers have been folded over as shown in FIG. 25, a further sheet 167 of polyethylene may be bonded or adhesively secured to the inner side of the blank as is shown in FIG. 26 and preferably this sheet 167 extends between the fold line 165 and the free edge portion 162 so as to lap over the edge 163 in the fashion shown. When the manufacturer's joint is made, the polyethylene film 167 is subjected to heat in order to bond it to the outer surface portion 160 which it overlies and thus, it will be apparent that the polyethylene film 167 performs two functions, namely of providing means for securing contacting portions of the container together and for providing a means for rendering the same fluid tight.

It will be appreciated that the entire inner surface of the blank, after it has been folded, is covered with this polyethylene film and it is the presence of this film, being heat bonded which effects the sealing of the spine portion 151 in FIG. 6. Any suitable adhesive or other means may be utilized for securing the laterally projecting flaps in flatwise condition in the top of the container to ultimately effect the closed container construction as is illustrated in FIG 8.

The blanks previously described may be constructed individually such that each takes the form and shape shown in FIG. 3 initially but, of course, the blank just before it is ready for erection and filling and closing is folded over in the manner described in conjunction with FIGS. 25 and 26 and is ready for erection and subsequent filling and closing.

With reference more particularly at this time to FIGS. 12–14, the construction of the bottom of the container is illustrated. This construction is in many respects similar to the top. For example, as is shown in FIG. 12, the initial stage of erection is with the bottom opened as shown and then the marginal edge portion which lies below the score line 72 is folded in the manner shown in FIG. 13 to provide the downwardly projecting spine indicated generally by the reference character 170, the fold being effected about the oppositely disposed score lines 117 and 123. This places the end panel portions 27 and 31 in inwardly folded condition in a common plane, these end panels, of course, having underlying them the panels 35 and 33 respectively. This also provides laterally projecting flaps comprised of the right triangular portions 171 and 172 of end panel 29 which right triangular portions are underlying the triangular portion 174, see particularly FIG. 14. On the other side, the laterally projecting flap is comprised of the triangular portions 175 and 176 of end panel 25 which underlie the triangular portion 177 of this end panel, see particularly FIG. 14. After the assembly has been folded as shown in FIG. 3, the spine 170 is folded flat and then the end flaps are folded over and secured adhesively or otherwise in the position illustrated in FIG. 14. This completes the bottom closure for the container.

As previously mentioned, the construction of the top of the container presents a novel means for opening the container very rapidly and quickly and yet which, at the same time, permits the container to remain in sealed condition effectively throughout its life prior to being opened. The manner in which the seal is effected in the double thickness container is illustrated best in FIG. 9. In this figure, it will be apparent that the underlying blank section 12 is sealed throughout the spine portion 151 thereof and the slits 130 and 149 have underlying them the upper marginal edge portions of the two end panels 34 and 32 respectively. In FIG. 9, the two slits 130 and 149 are illustrated and the upper marginal edge portions 180 and 181 of the panels 32 and 34 respectively overlap beneath these slits with the edges of such marginal portions being disposed in close adjacency as indicated at the reference character 182. From FIG. 8, it will be readily apparent that a corner of the tab 84 is exposed immediately adjacent the apex of the triangular panel 90 so that a person may grasp this tab and by pulling smartly thereupon, the action shown almost completed in FIG. 10 is achieved. In FIG. 10, it will be seen that by pulling on the tab 84 as shown, the two layers constituting the spine 151 will be torn along the lines of perforation 80 and 95, such tear being indicated by the reference character 190 and then the tear will continue between the points 78 and 131 and 94 and 148, see particularly FIG. 4, such lines of tear being indicated in FIG. 10 respectively by the reference characters 191 and 192 and thence they will extend along the slits 130 and 149, through the lines of perforation 137 and 145 in the regions 193 and 194 respectively, and continue down through the slit portions 134 and 144 until they finally tear across through the line of perforation 141 at the apex of the end flap formed by the right triangular portions 91 and 92 superimposed upon the triangular portion 90. From a study of FIG. 9, it will be apparent that as the strip is torn away from the container, such strip being indicated generally by the reference character 195 in FIG. 10, the strip portions comprised of the strips 133 and 138, see FIG. 4, and the strips 150 and 146 will be torn away from the underlying marginal portions 180 and 181 of the inner layer of the blank generally at the interface between such layers. That is to say, the adhesive bond will be broken, exposing such underlying marginal edge portions 180 and 181 in the fashion best shown in FIGS. 10 and 11. At this point, the significance of the scorelines 76 and 93 will be apparent. These score lines permit the opened flap portion of the container to be disposed as a pouring spout. That is the portion 196 of the fold line 52 which separates the right triangular portions 79 and 91 will permit these portions to be folded outwardly along this line away from the underlying triangular portion 90 and, likewise, the right triangular portions 96 and 92 will be permitted to be folded outwardly along the portion 197 of score line 53 which separates these two right triangular portions. This is clearly illustrated in FIG. 11 and by this means, the container forms its own pouring spout. After the container has been used and with some of the contents still remaining therein, the pouring spout may be manually folded back down on its back into the original position substantially as is shown in FIG. 8, but, of course, with the strip 195 having been removed and thrown away.

With regard to the strip 195, the same is comprised of the two tabs 81 and 84 adhered together and the portions of the marginal edge of the container beyond the score line 70 which are between such tabs, being folded over along the score line 75 and together with this the strips 133, 138, 146 and 150 together with the small triangular piece 142, see particularly FIG. 4.

Referring at this time more particularly to FIGS. 1 and 2, a method of forming double thickness blanks in a continuous or roll fashion is illustrated. In this method, a roll of paperboard indicated by the reference character 200 is suitably mounted on a spindle 201 so that the sheet of material 202 may be issued therefrom. This sheet of material 202 is preferably, although not necessarily, provided with certain score lines and/or perforations, as desired, which are marked off in accordance with the design of the individual blanks. For example, the sheet may be initially provided with the several score lines 203, 204, 205, 206 and 207 formed continuously therealong and also with continuous lines of perforation 208, 209 and 210 and also transverse score lines 211 and 212 and transverse lines of perforations 213 and 214 and 215. Additionally, the periodic diagonal score lines 216, 217, 218, 219 as well as the score lines 220, 221, 222, 223, 224 and 225 are provided. The periodic diagonal lines of perforation 226, 227, 228 and 229 are also provided, all oriented as shown in FIG. 1. The sheet material 202 fed from the roll 200 is ultimately rolled up in the roll 230 mounted on a suitable spindle 231 but in the interim certain severing and folding steps are performed, as is illustrated in FIG. 1. First of all, the sheet 202 is continuously slit along one side edge as indicated by the reference character 232 and then periodically certain portions are stamped or otherwise cut therefrom, such portions being indicated by the reference character 233. The strip 234 formed by the slitting operation 232 joins all of the portions 233 together and not only makes it easy to remove these portions but also renders it easy to provide a certain amount of lateral tension on the sheet as the slitting and cutting away operations are performed. It will be evident that the cut-away portions 233 form therebetween one half 235 of the blank, which half corresponds to the section 12 indicated in FIG. 3 and then this half is folded over onto the remaining portion as is shown in the lower portion of FIG. 1, such fold being along the score line or line of perforation 207 corresponding to 11 in FIG. 3, so that the blanks are formed in the ribbon fashion, linked together by portions lying between the score lines 212 and 236, such region being indicated by the reference character 237. After the portions of the linked together blanks are folded on top of each other, a roll 238 of polyethylene sheet 239 corresponding to 167 in FIG. 26 is fed onto the inner face of the blank and then the entire assemblage passes through a pair of pinch rolls 240 and 241 mounted on suitable spindles 242 and 243 respectively, which rolls are preferably heated so as to bond the polyethylene film 239 to the inner side of the blank.

It will be understood that the roll 200 may be formed with a polyethylene film on the face thereof facing the viewer in FIG. 1 so that the ultimate assemblage after it passes from between the rolls 240 and 241 is of the construction illustrated in FIG. 26 or, the inner layer of polyethylene film may be omitted, that is, the layer 164 in FIG. 26 may be omitted, if desired, or other suitable means may be provided for rendering the exposed face of the blanks fluid tight so that at any rate, the roll 230 is constituted of blanks joined together and ready for erection, filling and closure.

It will be appreciated also that the score lines and perforations may be formed on the sheet material 202 as it is being unrolled from the roll 200 or it may be preformed thereon, as is desired. At any rate, the ultimate objective is to obtain a roll 230 of integrally linked blanks which may be utilized ultimately in the fashion indicated best in FIG. 19. However, before going on to describe this figure, it is to be clearly understood that the blanks which are linked together in the roll 230 are formed in the manner previously described in conjunction with FIG. 3 but, of course, are folded together into final blank form and coated with suitable sealing material as has been previously described.

The roll 230, see particularly FIG. 19, is mounted on a suitable spindle 250 and is fed therefrom in continuous blank form. Preferably, the blank ribbon is passed over a suitable idler roll 251 mounted on a suitable spindle 252 and then passed downwardly therefrom through any die or forming means (not shown) so as to form the same into generally rectangular tubular fashion as is indicated generally by the reference character 253 in the lower portion of FIG. 19. Substantially in the area 254, the manufacturer's joint is formed, preferably, by heat sealing if polyethylene is used, or by other means if other means are utilized. At any rate, the actual tube formation is effected in the general area indicated by the reference character 254. Immediately above the formation of the manufacturer's joint in the region 254, there is a filling station indicated generally by the reference character 255. A conduit 256 extending from this filling station terminates in a nozzle 257 projecting downwardly within the tube formation 253. The advancement of the material from the roll 230 is intermittent, each being of a length equal to the distance between the centers of areas 237 joining the adjacent blanks together. At one station, indicated generally by the reference character 258, heat sealing of the areas 237 is achieved, which corresponds generally to the disposition of the container as shown in FIG. 6 or 13. At this point, the filling station is operative to fill the partially formed container 260, whereafter the filling is interrupted and the sheet advanced from the roll 230 so that the container 260 next assumes a position previously maintained by the container 261 next therebelow. At the station indicated generally by the reference character 262, severing of the filled containers is effected and, as will be explained more fully hereinafter, this severing is alternately of a top and bottom nature. That is to say, one severing action is, in accordance with FIG. 20, straight across to form a bottom cut 263, whereas the next or alternate cut or severing is generally in the fashion indicated by the reference character 264 to form tabs 265 and 266 corresponding to tabs 84 and 81 in FIG. 3, on the adjacent filled containers 267 and 268. In other words, the linked blanks are alternately joined bottom to bottom and top to top. Therefore any printing that appears thereon must be upside down from one container to the next, see particularly FIG. 21. A completely severed, filled container, such as that indicated by the reference character 270 in FIG. 19 is then fed to any suitable mechanism for finishing the folding and sealing thereof as is shown sequentially in FIGS. 6, 7, and 8 and FIGS. 13 and 14.

In other words, in FIG. 19, the container 260 is being filled after having its bottom closed at the station 258 which, at the same time forms the bottom for the next lowermost container 261 which is actually upside down. At the station 262, the container 270 is completely severed from the chain and its top is uppermost, the top of the next preceding container 261 being disposed downwardly. When the container 260 is advanced to the position of the container 261 and consequently when the container 261 is disposed generally in the position of the container 270, it will be appreciated that the two containers are bottom to bottom and the severing station 262 will then form a straight cut between the containers 260 and 261 and then the next severing at 262 will be a top cut, and so on throughout the operation of the device.

As shown in FIG. 21, the heat sealing station 258 may take any convenient form wherein retractable heated die members 280 and 281 are operative to squeeze together the exposed portions of the areas 237 corresponding to the entire spine 151 in FIG. 6 and subject them to heat and pressure so as to seal the same, the die members then retracting to permit the passage of the container string therethrough. The severing station 262 is comprised of retractable die members 282 and 283 and any suitable means associated therewith for forming the alternate cuts illustrated in FIG. 20, the severing, of course, being operated preferably in timed relationship with the heat sealing station operation.

FIG. 22 illustrates an alternate method of forming the top construction. In this figure, it will be seen that the side flap at one side of the container construction has been poked inwardly rather than outwardly, as indicated generally by the reference character 290, leaving the other side laterally outwardly projecting as indicated by the reference character 291.

Referring to FIG. 15, a modified container blank is illustrated therein. This blank is of single thickness and comprises a generally rectangular sheet of material having a series of longitudinally extending score lines 300, 301, 302 and 303 thereon. Spaced inwardly a slight distance from the bottom edge 304 is a transverse score line 305 forming a marginal edge portion 306 and a further transverse score line 307 is provided dividing the lower end of the blank into the end panels 308, 309, 310 and 311. The longitudinal score line 303 is disposed closely adjacent the side edge 312 to form the edge strip 313 for forming the manufacturer's joint of the finished container.

In the upper region of the blank, there is a transverse score line 314 dividing the blank into a series of upper end panels 315, 316, 317 and 318, there being a further transverse score line 319 closely adjacent the upper edge of the blank, substantially as shown.

The score lines 300, 301, 302 and 303 divide the central region of the blank into the main body panels 320, 321, 322 and 323 which, of course, form the sides of the container when erected.

The blank shown in FIG. 15 displays its inner side to the viewer and it is to be understood that if desired this inner side may be provided with a polyethylene film for sealing and water proofing purposes. The upper end panel 318 is provided with a pair of upwardly convergent score lines 324 and 325 originating respectively at the lower corners 326 and 327 and extending therefrom to a point of intersection 328 on the score line 319 coincidental with the longitudinal center line of the body panel 323, there being a short longitudinally extending score line 329 extending from the point 328 to the upper edge of the blank.

Referring now to FIG. 16, it will be seen that the upper end panel 317 is provided with a diagonal score line 330 originating at the lower corner 331 of the main body panel 322 extending therefrom to the point 332 on the score line 314 on the center line of the panel 322 providing in the area of the upper end panel 317 a right triangular panel portion 333 having its hypotenuse along the score line 330 and its opposite legs along the score line portion 334 of score line 314 and score line portion 335 of score line 301. The upper end panel 316 is provided with a pair of upwardly convergent score lines 336 and 337 dividing such end panel into the triangular portion 338 and the two right triangular portions 339 and 340, substantially as shown, and with such scorelines 336 and 337 intersecting at the point 341 on the score line 314. A short longitudinally extending score line 342 extends from the point 341 to the upper edge portion 343 of the blank. The end panel 315 is provided with a diagonal score line 345 originating from the lower corner 346 of the body panel 320 at a point coincidental with the score line 337 and extending upwardly therefrom to the point 347 on the score line 314 along the center line of the body panel 329 to provide in the end panel 315 the right triangular area 348.

The upper edge of the blank is provided with the two tabs 349 and 350 and there is also provided in the area between the tabs a line of weakening or severance for opening of the container. The initial portions of this line are the lines of perforation 351 and 352 in the upper end panels 317 and 315 respectively, which extend inwardly from the upper edge of the blank along one side of the respective tabs 349 and 350 to terminate in closely spaced adjacency to the points 332 and 347 respectively. The next portions of the line of severance or weakening are the slits 353 and 354 which are spaced inwardly and generally parallel from the opposite portions of the score line 314 and which form therebetween the strips 355 and 356. Continuing along the line of weakening or severance are the two lines of perforation 357 and 358 and cooperating therewith the slits 359 and 360 to present the strip portions 361 and 362 forming continuations respectively of the strips 355 and 356. The last portion of the line of severance or weakening is the short line of perforation 363 which forms the apical triangular portion 364 as shown.

Now, to seal along behind the lines of perforations and slits, a separate sealing strip 370, see particularly FIGS. 15 and 16, is provided, which is adhesively or otherwise secured to the inner face of the blank and completely overlies the portion of the line of severance or weakening line between the points 371 and 372 as shown in FIG. 16.

When the container is erected and closed in the manner previously described in conjunction with FIGS. 5 through 8, the sealing strip 370 will be folded back upon itself along a continuation of the score line 342 with the upper edge portions 373 and 374 sandwiched between the spine upon which the tabs 349 and 350 are formed. When the tab and throw-away strip portion is pulled from the container, the portions 373 and 374 of the sealing strip will be exposed substantially as is shown in FIG. 17 wherein the erected and filled container is shown in pouring position.

It will be appreciated that the container in accordance with the present invention is formed from a blank which is characterized by having score lines thereon which facilitate the squeezing together of marginal edge portions of the blank after it has been formed in tubular fashion so that the blank will fold down flat and having triangular flap portions projecting from opposite sides thereof. For example, referring to FIG. 3, the score line 70 at the top of the blank facilitates the formation of the spine 151 as shown in FIG. 6, and the score lines 86 and 87 together with the portion of the score line 40 extending between the points 77 and 78 permits one of the flaps to naturally form and the score lines 62 and 63 together with the portion of the score line 40 between the points 64 and 65 permits the other flap to naturally form so that the mere action of squeezing together the upper marginal edge of the blank with the score lines 74 and 75 representing the folds, the entire structure will naturally fall into the shape shown in FIG. 6, properly positioning all of the parts. Then when the spine 151 is laid down flat, as shown in FIGS. 7 and 18, the flaps can be folded over as shown in FIGS. 7 and 8 to effect the final construction of the container.

The bottom of the container is similarly constructed, the score line 72 forming the marginal edge strip which ultimately permits the formation of the spine 170 shown in FIG. 13.

As previously stated, the score lines 76 and 93, see FIG. 3, do not cooperate in the sealing and closing and final erection steps of the container but they do cooperate with the other score lines to permit the pouring spout to naturally result when the container is opened. This effect is shown most clearly in FIG. 11. In FIG. 11, it will be clear that the score lines 76 and 87' and the score lines 93 and 86' cooperate to form the pouring spout.

By providing a line of weakening or severance which is immediately adjacent to but slightly spaced from the score line 70, the strip portions defined between such line of weakening or severance and such score line constitute easily removable portions of the container which, even though the severed portion is backed up by sealing means, either in the form of an inner layer such as the section 12 of FIG. 3 or the strip 370 as shown in FIGS. 15 and 14, or any equivalents thereto, may be readily torn away from such portions sealingly backing them up so that the container is readily and easily opened. The sealing means which backs up the line of weakening or severance does not in itself form a closure so that when these strips are torn away therefrom, the opening will naturally result.

That is to say, with the double thickness blank, see particularly FIG. 9, the sealing portions 180 and 181 merely abut each other at 182 or if they do not actually abut are disposed in closely spaced relationship and there is no sealing thereacross so that when the strip portions 133 and 150 are removed, the container will be open along the region 182. Similarly, when the strip 370 is used, the overlapping portions 373 and 374 thereof, see particularly FIG. 18, are not sealingly joined but merely are in contact with each other so that when the container is opened, these overlapping portions 373 and 374 are separated to form the opening in the top of the container as is shown in FIG. 17. It will be appreciated that the line of weakening or severance may be a slit in the entirety of its transversely extending portions since it does not initially appear as a line of severance at all due to the sealing means backing it up and as a matter of fact, it is conceivable, although rather cumbersome, to provide the tear away portion initially as a completely separate entity which is joined to the remainder of the blank by the sealing means which backs it up.

We claim:

1. The method of forming and filling a succession of rectangular containers which comprises the steps of scoring a continuous sheet of paperboard longitudinally to present a series of panels thereacross and providing transverse score lines between at least some of the adjacent longitudinal score lines to determine foldable closure sections of the thus formed connected together container blanks, forming the continuous sheet into a roll, feeding the sheet of predetermined container blanks from the roll and erecting the same into tubular fashion about the longitudinal scoring, infolding together and sealing foldable closure sections of adjacent container blanks, introducing a commodity into the tube above such seal, then sealing the tube by infolding together the next successive closure section to include the commodity in a completely sealed container.

2. The method of forming and filling a succession of rectangular containers which comprises the steps of scoring a continuous sheet of paperboard longitudinally to present a series of panels thereacross and providing transverse score lines between at least some of the adjacent longitudinal scores to determine foldable closure sections of the thus formed connected together container blanks, advancing the sheet of preformed container blanks and erecting the same into tubular fashion about the longitudinal scoring, squeezing together and sealing foldable closure sections of adjacent container blanks, introducing a commodity into the tube above such seal, then sealing the tube by squeezing together the next successive closure sections to include the commodity in a completely sealed container, severing such formed and sealed container.

3. The method of forming and filling a succession of rectangular containers which comprises the steps of scoring a continuous sheet of paperboard longitudinally to present a series of panels thereacross and providing transverse score lines between at least some of the adjacent longitudinal score lines to determine foldable closure sections of the thus formed connected together container blanks, cutting out discrete areas from one side edge of the sheet at uniformly spaced points therealong to leave along such one side a series of spaced panels connected to the remainder of the sheet only along one of the longitudinal score lines, then folding such spaced panels along the stated longitudinal score line along which they are connected to the remainder of the sheet so that the panels are in face to face contact with the remaining portion of the sheet, applying a coating of sealing material continuously upon the folded sheet portion on that side thereof upon which the panels are folded, advancing the sheet of preformed container blanks and erecting the same into tubular fashion about the longitudinal scoring, squeezing together and sealing foldable closure sections of adjacent container blanks, introducing a commodity into the tube above such seal, then sealing the tube by squeezing together the next successive closure sections to include the commodity in a completely sealed container, severing the sealed container to form an individual sealed container with commodity therein.

4. The method according to claim 3 including the intermediate step of forming the continuous succession of folded over and coated container blanks into a roll and thereafter feeding the sheet of preformed container blanks from the roll to erect the same into tubular fashion.

5. The method of erecting and filling rectangular containers for flowable commodities which comprises the steps of feeding a sheet of preformed container blanks including determined lines of longitudinal and transverse scoring from a roll and erecting the same into tubular relation about the longitudinal scoring, infolding together and sealing simultaneously adjacent ends of two blanks defined by transverse scoring, introducing a commodity into the tube above such seal, then sealing the tube by infolding together opposite portions thereof comprising the next successive blank ends while substantially simultaneously severing the tube within the first sealed area thereof.

6. The method of erecting and filling rectangular containers for flowable commodities which comprises the steps of feeding a continuous sheet of preformed container blanks including determined lines of longitudinal and transverse scoring from a roll and erecting the same into tubular relation about the longitudinal scoring to form planar walls, infolding together and sealing adjacent ends of two blanks defined by transverse scoring while laterally projecting triangular portions thereof beyond the tubular planar walls, introducing a commodity into the tube above such seal, then sealing the tube by infolding together opposite portions thereof comprising the next successive blank ends, severing the formed and sealed container from the continuous sheet tubular formation, infolding the projecting triangular portions into flatwise secured relation to the infolded blank ends to complete the free standing containers.

7. The method of forming and filling rectangular containers for flowable commodities, the container including integral dispensing means, the method comprising the steps of scoring a continuous sheet of paperboard longitudinally to determine a series of panels thereacross and providing transverse score lines between at least some of the adjacent longitudinal scores to determine foldable end closure sections of the thus determined connected together container blanks, substantially simultaneously providing transverse lines of severance in the blanks adjacent alternating pairs of connected together end closure sections so that adjacent blanks are in reverse end to end order, advancing the sheet of preformed container blanks while maintaining the connected together relation and erecting the same into tubular relation about the longitudinal scoring to form planar walls, introducing a commodity into the tube while successively infolding together and sealing ends of adjacent blanks while laterally projecting triangular portions thereof beyond the tubular walls, severing the filled and sealed portions from the remainder of the tube by alternating severing means to provide in one instance a straight line of severance thereacross and in the beforementioned alternating pairs of end closures a non-linear line of severance providing end tabs in each container, infolding the projecting triangular portions into flatwise secured relation to the infolded blank ends while maintaining the end tabs in exposed relation to permit opening of the dispensing means of the container.

8. The method according to claim 7 including the intermediate step of forming the continuous succession of foldably determined container blanks into a roll and thereafter feeding the sheet of preformed blanks from the roll to erect the same into tubular relation.

9. The method according to claim 7 including the steps of cutting out discrete areas from one side edge of the sheet at uniformly spaced points therealong to leave along such one side a series of spaced panels connected to the remainder of the sheet only along one of the longitudinal score lines, then folding such spaced panels along the stated longitudinal score line so that the panels are in face to face contact with the remaining portion of the sheet.

References Cited in the file of this patent

UNITED STATES PATENTS

| | | |
|---|---|---|
| 2,146,831 | Maxfield | Feb. 24, 1939 |
| 2,214,593 | Mustin | Sept. 10, 1940 |
| 2,335,865 | Lanigan | Dec. 7, 1943 |
| 2,409,460 | Waters | Oct. 15, 1946 |
| 2,665,616 | Jungmayr | Jan. 12, 1954 |
| 2,759,290 | Piazze | Nov. 6, 1956 |
| 2,769,290 | Harriman | Nov. 6, 1956 |
| 2,775,082 | Vogt | Dec. 25, 1956 |
| 2,874,524 | Ringler | Feb. 24, 1959 |
| 2,925,948 | Alden | Feb. 23, 1960 |
| 2,964,226 | Nerenberg | Dec. 13, 1960 |

UNITED STATES PATENT OFFICE
CERTIFICATE OF CORRECTION

Patent No. 3,082,583 March 26, 1963

Louis P. Larson et al.

It is hereby certified that error appears in the above numbered patent requiring correction and that the said Letters Patent should read as corrected below.

In the grant, lines 3 and 13, and in the heading to the printed specification, lines 4 and 5, for "Riegal Paper Corporation", each occurrence, read -- Riegel Paper Corporation --; column 3, line 50, for "oprtions" read -- portions --; column 8, line 3, for "115" read -- 15 --; lines 52 and 53, after "therefrom" insert -- to --; column 10, line 41, after "tight" insert a period; column 18, line 44, for "Feb. 24, 1939" read -- Feb. 14, 1939 --; line 49, for "2,759,290" read -- 2,759,648 --; same line, for "Nov. 6, 1956" read -- Aug. 21, 1956 --.

Signed and sealed this 27th day of August 1963.

(SEAL)
Attest:

ERNEST W. SWIDER
Attesting Officer

DAVID L. LADD
Commissioner of Patents